July 4, 1967 A. G. V. GUSTAFSSON ET AL 3,329,226
SPRING SUSPENSION DEVICE FOR VEHICLES
Filed Oct. 13, 1965 2 Sheets-Sheet 1
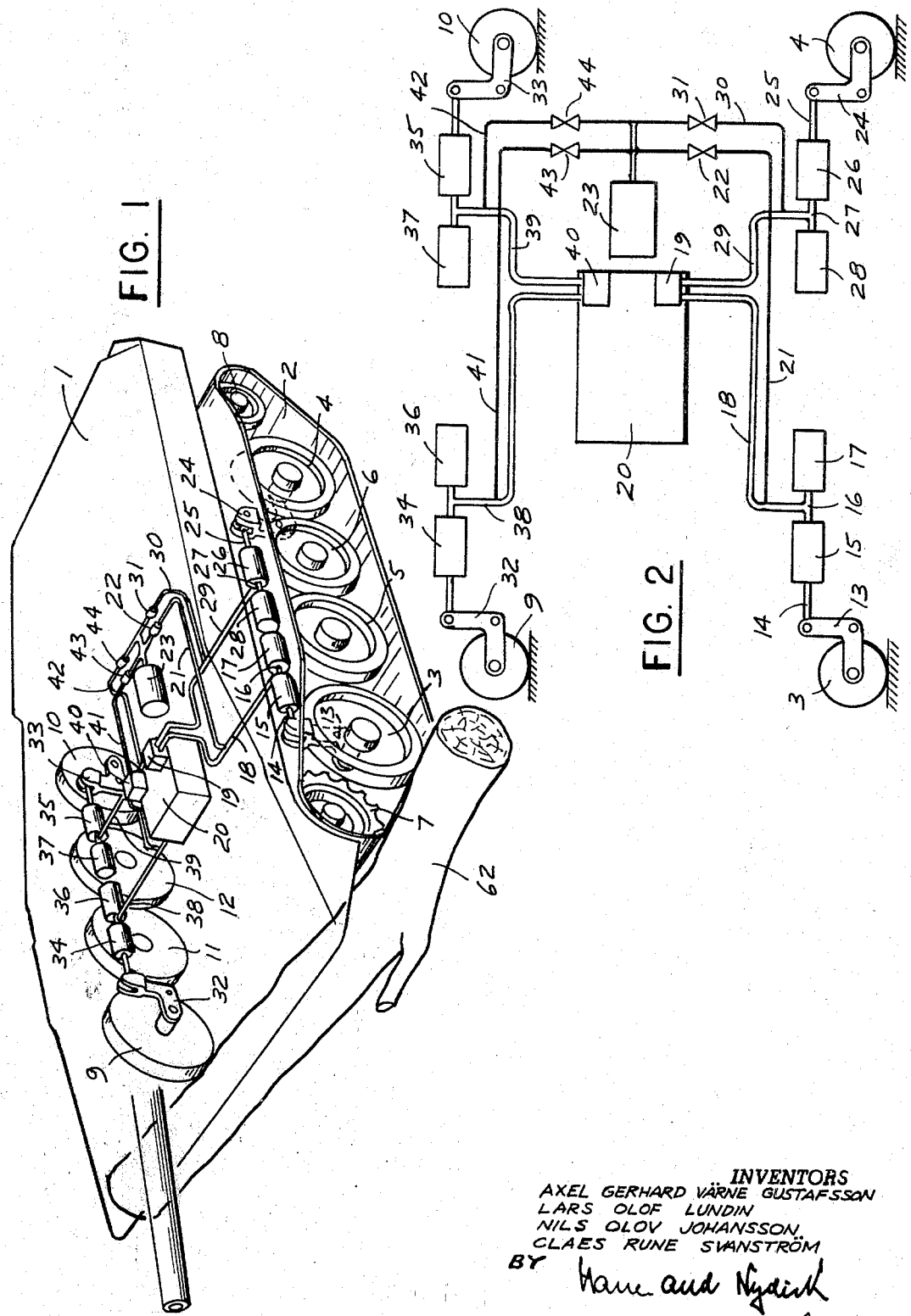
INVENTORS
AXEL GERHARD VÄRNE GUSTAFSSON
LARS OLOF LUNDIN
NILS OLOV JOHANSSON
CLAES RUNE SVANSTRÖM
BY Hane and Nydick
ATTORNEYS July 4, 1967  A. G. V. GUSTAFSSON ETAL  3,329,226
SPRING SUSPENSION DEVICE FOR VEHICLES
Filed Oct. 13, 1965                                      2 Sheets-Sheet 2

INVENTORS
AXEL GERHARD VÄRNE GUSTAFSSON
LARS OLOF LUNDIN
NILS OLOV JOHANSSON
CLAES RUNE SVANSTRÖM
BY Hanne and Nydick
ATTORNEYS

United States Patent Office 3,329,226
Patented July 4, 1967

3,329,226
SPRING SUSPENSION DEVICE FOR VEHICLES
Axel Gerhard Varne Gustafsson, Lars Olof Lundin, Nils Olov Johansson, and Claes Rune Svanström, Karlskoga, Sweden, assignors to Aktiebolaget Bofors, Bofors, Sweden, a Swedish corporation
Filed Oct. 13, 1965, Ser. No. 495,597
Claims priority, application Sweden, Nov. 14, 1964, 13,747/64
8 Claims. (Cl. 180—9.2)

ABSTRACT OF THE DISCLOSURE

A suspension assemblage for absorbing shocks experienced by two front wheels and two rear wheels of a track-laying vehicle such as a combat vehicle. The assemblage is arranged to absorb extremely heavy shocks experienced by any of the wheels and to vary automatically the strength of its shock-absorbtion action in accordance with the severity of the shock to be absorbed. According to the invention, fluid is discharged from damping units of the device in response to a shock experienced by one of the wheels and the rate of discharge of the fluid is increased when the force of the shock is above a predetermined value.

---

The present invention relates to a spring suspension device for absorbing shocks experienced by a running wheel of a vehicle. More particularly, the invention relates to spring suspension devices for track-laying vehicles, especially for damping the shocks experienced by the track-guiding end wheels of such vehicles.

The invention is particularly advantageous for use with track-laying military vehicles, such as armored assault tanks and armored personnel carriers. The track-guiding wheels of vehicles of this kind may be subjected to very strong shocks, and it is highly desirable that the vehicle, after experiencing heavy shocks, be capable of continuing its travel without delay. It is known to provide for the running wheels of track-laying vehicles, especially for the track-guiding end wheels thereeof, spring suspension devices which include a shock-absorbing piston-cylinder damping unit which damps the incoming shocks and co-acts with a second damping unit acting as a pressure-storing unit. A spring suspension assembly of this kind is capable of compensating for normal shocks such as experienced by a vehicle traveling over rough ground, but a vehicle such as an assault tank may occasionally encounter more violent shocks, for instance, when the vehicle has to cross a fallen tree trunk or a similar obstruction. In such event, spring suspension devices of the general kind above referred to are likely to be overloaded.

It is an object of the present invention to provide for track-laying vehicles, particularly military vehicles, a novel and improved spring suspension device of the general kind above referred to which is capable of damping even extremely heavy shocks without requiring excessive dimensions of the damping units of the spring suspension device to avoid overloading of the same.

The aforepointed out object, features and advantages and other objects, features and advantages which will be pointed out hereinafter are attained by providing a spring suspension device comprising a damping cylinder including a closed spaced filled with a damping fluid and a piston slidable in the cylinder. This piston is coupled to shock-transmitting means for transmitting to the piston shocks experienced by a wheel with which the spring suspension device is associated. The piston, as a result of a shock transmitted thereto, is displaced in its cylinder, thereby correspondingly increasing the pressure of the damping fluid in the closed space of the cylinder, thus damping the piston movement and with it the shock experienced by the wheel. The closed cylinder space is connected to a discharge conduit, the flow of damping fluid through which is controlled by a normally closed safety valve which opens the discharge conduit when and while the fluid pressure in the closed cylinder space exceeds a predetermined value, or in other words, when and while the wheels to be protected is subjected to a particularly heavy shock.

To control further the discharge of damping fluid from the closed cylinder space, a one-way valve may be provided in the inlet opening of the safety valve. This one-way valve opens in response to a fluid pressure in the closed cylinder space above a predetermined value.

The invention further encompasses the provision of a second discharge conduit connected to the safety valve. This second discharge conduit is controlled by a normally closed auxiliary safety valve which opens the second discharge conduit when the fluid pressure within the first safety valve exceeds a predetermined value. The purpose of the second discharge conduit is to accelerate the discharge of pressure fluid from the closed cylinder space and to control the reclosing of the safety valve when the fluid pressure caused by the shock subsides.

The first safety valve preferably includes a valve member having several wall portions, some of which are exposed to the fluid pressure within the valve in a direction such that the valve member is urged into the valve-closing position, and others of which urge the valve member into the valve-opening position in response to the fluid pressure acting upon said other wall portions. The wall portions are so correlated that the valve member remains in its closing position unless the fluid pressure within the safety valve exceeds a predetermined value.

In the accompanying drawing a preferred embodiment of the invention is shown by way of illustration, and not by way of limitation.

In the drawing:

FIG. 1 is a diagrammatic perspective view of a track-laying vehicle equipped with spring suspension devices according to the present invention;

FIG. 2 is a flow diagram of the shock-absorbing assemblage on the vehicle according to FIG. 1;

Figure 3:
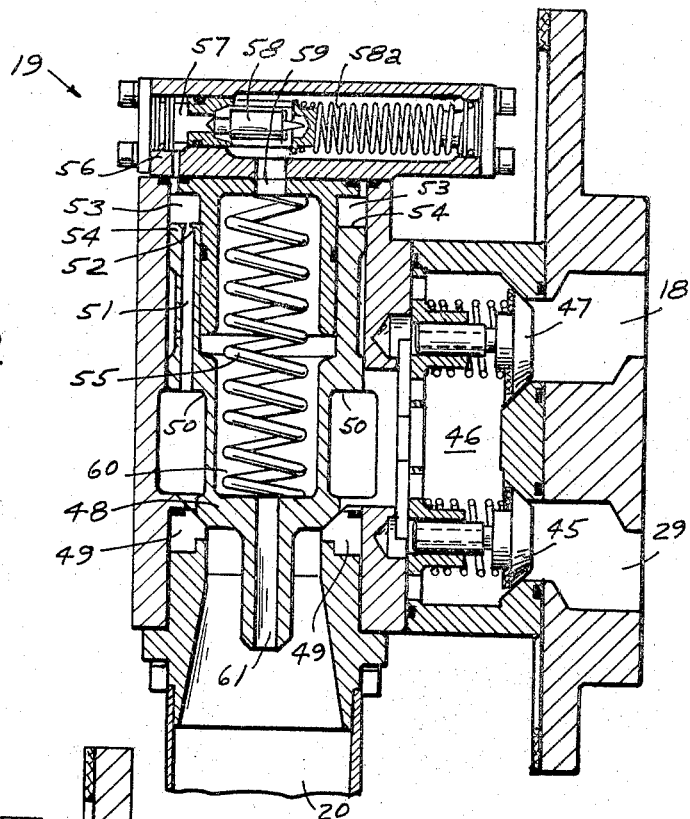
FIG. 3 is a sectional elevational view of one of the safety valves included in the assemblage of FIGS. 1 and 2, the valve being shown in its closed position.

Referring first to FIGS. 1 and 2 in detail, the track-laying vehicle 1 as exemplified in these figures comprises two tracks 2 which on one side of the vehicle are guided over end running wheels 3 and 4 and intermediate running wheels 5 and 6. Track 2 is driven by a drive gear 7 and tensioned by a tensioning roller 8. The second track of the vehicle is guided over end wheels 9 and 10 and intermediate running wheels 11 and 12. In this connection is should be pointed out that in FIG. 2 the tracks are omitted to simplify the illustration, front end wheels 3, 9 and rear end wheels 4, 10 being shown as resting directly on a supporting surface.

End wheel 3 is supported on one arm of a bellcrank lever 13, the other arm of which is coupled by a piston rod 14 to a piston slidable in the cylinder of a hydraulic damping unit 15. Damping unit 15 includes a closed cylinder space filled with a suitable damping fluid, such as oil. This cylinder space is connected by a conduit 16 to a second damping unit 17 comprising a closed cylinder including a preferably freely floating piston. The cylinder space on the piston side facing damping unit 15 is more or less filled with damping fluid, and the cylinder space on the opposite side of the piston may be filled with a pressurized damping fluid, such as an inert gas, for instance, nitrogen.

If wheel 3 is forced upwardly due to an obstruction on the surface over which it travels, such as a tree trunk 62, the resulting displacement of the piston in damping unit 15 causes a corresponding increase of the pressure of the damping fluid in unit 15. This pressure is transmitted through conduit 16 to damping unit 17 and is absorbed by the coaction of the two damping units. Spring suspension devices of the kind constituted by the two coacting damping units 15 and 17 are more fully described in copending application Ser. No. 491,655 filed Sept. 30, 1965, by Axel Gerhard Varne Gustafsson and entitled "A Spring Suspension Device." The co-pending application and the present application are assigned to a common assignee.

Rear wheel 4 is similarly supported by a bellcrank lever 24, and shocks experienced by this wheel are absorbed by transmitting the shocks by means of a connecting rod 25 to damping units 26, 28 connected by a conduit 27. Front wheel 9 is coupled to a spring suspension device including a bellcrank lever 32 and damping units 34, 36, and rear wheel 10 is coupled to a spring suspension device including a bellcrank lever 33 and damping units 35, 37. The psring suspension devices for wheels 4, 9 and 10 should be visualized as being the same as has been described in greater detail for the spring suspension device coupled to wheel 3.

The conduit 16 between damping units 15 and 17 is connected to a conduit 18 leading to a safety valve 19, which will be more fully described hereinafter. Valve 19 is connected to an oil supply container 20 and is preferably mounted on the same. Conduit 18 is further connected to a pipe 21 leading to an oil pump 23. A valve 22 included in pipe 21 permits opening and closing of this pipe. Similarly, conduit 27 between damping units 26 and 28 is connected by a conduit 29 to safety valve 19. A pipe 30 is branched off from conduit 29 and leads via a control valve 31 to pump 23.

Damping units 34 and 36 are connected by a conduit 38 to a safety valve 40 similar to safety valve 19 and damping units 35 and 47 are connected by a conduit 39 to safety valve 40. Conduit 38 is further connected by a pipe 41 via a control valve 43 to pump 23. Similarly, conduit 39 is connected to the pump by a pipe 42 via a control valve 44.

The structural arrangement of safety valve 19 (which is the same as that of safety valve 40) will now be described in connection with FIGS. 3 and 4.

Conduit 18 leads via a spring-loaded one-way valve 47 into an oil chamber 46 formed within valve 19. Similarly, conduit 29 leads via a spring-loaded one-way valve 45 into the same oil chamber 46. A displaceable valve member 48 controls a flow passage between oil chamber 46 and oil container 20. The valve member is pressed against a valve seat 49 by the oil pressure valve 46 when valve 19 is inactive due to neither of the wheels 3 and 4 being subjected to a shock. As is evident, valve member 48, when seated upon its seat 49, closes the flow passage leading from oil chamber 46 to container 20. Oil chamber 46 is connected by a duct 51 to an annular oil space 53. The duct includes a constriction 52, the purpose of which will be more fully explained hereinafter. The pressure of oil in space 53 acts upon an annular surface 54 of valve member 48. The plane of surface 54 is transverse to the direction of displacement of valve member 48, so that the oil pressure in space 53 will urge valve member 48 into its closing position. The valve member is further urged into its closing position by a loaded coil spring 55.

Annular oil space 53 is connected by a duct 56 to a further oil space 57. This space is connectable to oil container 20 through a bore 59, space 60 within the valve member and a second bore 61 through valve member 48. The connection between oil space 57 and first bore 59 is controlled by a spring-loaded hydraulic plunger 58 constituting an auxiliary valve. As is clearly shown in FIGS. 3 and 4, the plunger is urged by a loaded coil spring 58a into its position closing off oil space 57. Accordingly, the plunger will be moved into a position opening the passage to bore 59 when the fluid pressure in space 57 exceeds the counter pressure of spring 58a.

The shock-absorbing assemblage as hereinbefore described operates as follows:

Let it be assumed that the front wheels 3 and 9 of the vehicle 1 encounter an obstruction, such as tree trunk 62. As a result, the two front end wheels 3 and 9 are subjected to an upwardly direct heavy shock. This shock is transmitted by bellcrank levers 13 and 32 to damping units 15, 17 and 34, 36, whereby the damping oil contained in these units, as previously described, is forced through conduits 18 and 38 into safety valves 19 and 40, respectively.

Figure 4:
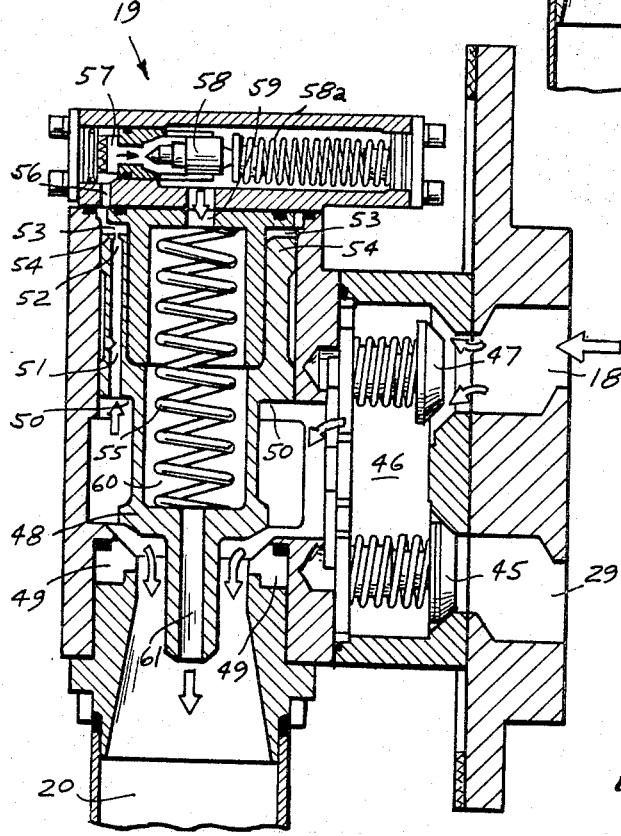
FIG. 4 is a sectional elevational view of the same valve showing the same in its open position due to a shock to be absorbed.

Referring now to FIG. 4, this figures shows valve 19 with one-way valve 47 open due to the pressure build-up caused by the shock experienced by wheel 3. The resulting influx of oil into oil space 46 increases the pressure therein, and this pressure build-up acts upon the annular surface 50, thereby causing a displacement of valve member 48 into the open position against the counter pressure of spring 55 and the oil pressure in space 53. Oil will now flow from oil space 46 to oil container 20. The pressure build-up in the closed cylinder space of damping unit 15 is now relieved due to the outflow of oil from this space, thereby compensating for the heavy shocks experienced by front end wheels 3 and 9 and transmitted to damping units 15 and 34. In this connection it may be mentioned that safety valve 40 operates in the same manner as safety valve 19.

The outflow of oil from the damping units 15 and 34 due to the heavy shock absorbed by these units softens the shock-absorbing function of the units. As a result, the prow or nose of vehicle 1 may be lowered too far in reference to the surface along which the vehicle is moving. The loss of damping oil can be conveniently made up by opening valves 22 and 43, thereby connecting oil pump 23 to damping units 15 and 34 to replenish the damping oil in the same.

As is evident from the previous description, and also from an analysis of FIGS. 1 and 2, each of the end wheels 3 and 9 has its own safety valves, to wit, valves 19 and 40. Such individual safety valves can be dimensioned considerably smaller than a common safety valve would have to be dimensioned, as such common valve would have to compensate for the oil pressure reaching it through both conduits 18 and 38 in response to heavy shocks experienced by wheels 3 and 9. However, a common safety valve can be safely provided for the two wheels on the same side of the vehicle; that is, for wheels 3, 4 and 9, 10, respectively. In actual practice it is very unlikely that a front wheel and the corresponding rear wheel will simultaneously experience a very heavy shock, such as caused, for instance, by a tree trunk. However, the two front wheels and the two rear wheels, respectively, may readily simultaneously experience a heavy shock, as is exemplified by the obstruction shown in FIG. 1.

Reverting to FIG. 4, the one-way valve 47 of the safety valve shown in this figure is so set that it will open only in response to a predetermined high pressure in conduit 18, for instance, in response to a pressure of about 150 km./cm.² As is evident, a pressure in conduit 18 which is high enough to open valve 47 causes an equally high pressure build-up in oil space 46. Such pressure build-up in space 46 not only causes opening of valve member 48 by acting upon annular surface 50, but also is propagated through duct 51 and its constriction 52 to the annular oil space 53. As stated before, the oil pressure in this space acts upon the annular oil space 54 of valve member 48 in the closing direction of the valve member. The oil pressure build-up in space 53 is extended through duct 56 to oil space 57, in which it acts upon one side of hydraulic plunger 58. The counter pressure of spring 58a acting upon this plunger is so adjusted that the plunger will yield in response to a predetermined pressure in space 57, such as 150 km./cm.². Displacement of plunger 58 into its open position connects oil space 57 with oil container 20 via bore 59, the space 60 in valve member 48 and bore 61. As a result, oil pressure in space 57 decreases rapidly, and the pressure in oil space 53, which is connected to space 57 through duct 56, also decreases. However, due to the constriction 52, the pressure drop in oil spaces 57 and 53 is only slowly extended to oil space 46. Consequently, the closing pressure acting upon wall surface 54 is less than the opening pressure acting upon wall surface 50 of the valve member. Hence, valve 48 remains in the position shown in FIG. 4. After the pressure in oil space 46 has gradually dropped due to the discharge of oil from spaces 53 and 57, the valve member is returned to its closing position by the action of spring 60 and the restoration of the initial pressure differential between oil spaces 46 and 53.

While the invention has been described in detail with respect to a certain now preferred example and embodiment thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A suspension assemblage for absorbing shocks experienced by two front wheels and two rear wheels of a track-laying vehicle, said assemblage comprising in combination:
   a damping unit containing damping fluid for each of the four wheels;
   a shock-transmitting means for each of the four wheels, each of said shock-transmitting means being coupled to one of the damping units to transmit shocks experienced by the wheel coupled to the respecitve damping unit thereby causing an increase of the pressure of the fluid in said damping unit;
   first discharge conduits, each of said conduits being connected to one of said damping units for discharging damping fluid therefrom;
   a common reservoir for damping fluid communicating with each of said discharge conduits;
   two normally closed safety valve means, one of said valve means being included in the discharge conduits connected to the damping units on one side of the vehicle and the other being included in the discharge conduits connected to the damping units on the other side of the vehicle, both valve means being in communication with said reservoir, each of said safety valve means being responsive to the fluid pressure in the respective damping units and arranged to open for the discharge of fluid therefrom into said reservoir when the fluid pressure is above a first predetermined value in the respective damping unit;
   a second discharge conduit included in each of said safety valve means, each of said second discharge conduits communicating with the first discharge conduits and the reservoir; and
   a normally closed auxiliary valve means included in each of said second conduits, each of said auxiliary valve means being arranged to open in response to a pressure build-up in either one of the respective two damping units above a second predetermined value higher than the first predetermined value thereby accelerating the discharge of fluid through the respective safety valve means into said reservoir.

2. An assemblage according to claim 1 and comprising a normally closed one-way valve means included in each of said discharge conduits intermediate the respective safety valve means and the respective damping unit, each of said one-way valve means opening the respective discharge conduit in response to a fluid pressure above a predetermined value in the respective damping unit.

3. An assemblage according to claim 2, wherein each of said safety valve means comprises a valve housing including a valve chamber having an inlet opening connected via said discharge conduit to said damping unit and an outlet leading to the discharge end of the conduit, said housing including a valve seat dividing the chamber into two compartments, said one-way valve means controlling the inlet opening of the chamber, and a valve member slidable in said chamber between a valve-closing position in which the valve member engages said seat and a valve-opening position in which the valve member is disengaged from said seat, said valve member including a wall portion which in response to a fluid pressure built up above a predetermined value in the compartment including the inlet opening displaces the valve member from its closing position into its opening position.

4. An assemblage according to claim 3, wherein said second discharge conduit connects the compartment including the inlet opening with the respective first discharge conduit, said auxiliary valve means opening the respective second discharge conduit in response to a pressure build-up in said last-mentioned compartment above said higher predetermined value to accelerate the discharge of fluid from said compartment.

5. An assemblage according to claim 4, wherein said valve housing includes a further chamber connected with one side of said auxiliary valve means and with the compartment including said inlet opening to provide a fluid flow passage from said compartment into said further chamber, fluid pressure acting upon said one side of the auxiliary valve means moving the same from the closed position into the open position in response to a fluid pressure above a predetermined value in said further chamber, said second chamber being bounded by a second wall portion of said valve member, said second wall portion being so oriented that fluid pressure acting upon the same urges the valve member toward its closing position.

6. An assemblage according to claim 5, wherein a spring means urges the valve member into its closing position, and wherein said first and second wall portions of the valve member are so correlated that the fluid pressure acting upon said second wall portion in conjunction with the pressure of said spring means retains the valve member in its closing position unless the fluid pressure in the compartment including the inlet opening exceeds a predetermined value.

7. An assemblage according to claim 1, and comprising a make-up conduit connected to each of said damping units for supplying make-up fluid thereto replenish fluid discharged therefrom, into said reservoir and valve means for selectively opening and closing said make-up conduit.

8. A shock-absorbing assemblage for a track-laying vehicle having two track-guiding front wheels and two track-guiding rear wheels to absorb shocks experienced by any of said wheels, said assemblage comprising for each of said wheels a spring suspension device including a damping unit containing damping fluid, shock-transmitting means coupled to a respective one of said wheels for transmitting shocks experienced by the respective wheel to the damping unit of the spring suspension device associated therewith, thereby causing an increase of the pressure of the damping fluid in the respective damping unit, a discharge conduit connected to the respective damping unit for discharging damping fluid therefrom, a common normally closed safety valve means for the front wheel and the rear wheel on each side of the vehicle, each of said common safety valve means being included in the two discharge conduits of the respective two wheels and being responsive to the fluid pressure in either of said two conduits connected thereto to open the respective discharge conduit by and during a fluid pressure in the conduit leading to the respective damping unit.

(References on following page)

References Cited

UNITED STATES PATENTS

| | | | |
|---|---|---|---|
| 2,388,820 | 11/1945 | Bonnel | 137—491 |
| 2,818,311 | 12/1957 | Ashley | 305—10 |
| 2,835,266 | 5/1958 | Morte. | |
| 3,082,043 | 3/1963 | Orton | 180—9.2 X |
| 3,246,405 | 4/1966 | Reynolds | 305—27 X |
| 3,254,738 | 6/1966 | Larsen | 305—10 X |
| 3,262,522 | 7/1966 | Johnson | 180—9.2 X |

LEO FRIAGLIA, *Primary Examiner.*

RICHARD J. JOHNSON, *Examiner.*